(12) United States Patent
Ruggiero et al.

(10) Patent No.: US 8,507,591 B2
(45) Date of Patent: Aug. 13, 2013

(54) WATERBORNE SOFT-FEELING COATING COMPOSITION WITH HIGH GLOSS

(75) Inventors: Murray A. Ruggiero, East Haven, CT (US); Harold W. Chubb, San Ramon, CA (US); Diane J. Burt, Bristol, CT (US)

(73) Assignee: Monument Chemical Kentucky, LLC, Indianapolis, IN (US)

( * ) Notice: Subject to any disclaimer, the term of this patent is extended or adjusted under 35 U.S.C. 154(b) by 0 days.

(21) Appl. No.: 10/840,917

(22) Filed: May 7, 2004

(65) Prior Publication Data

US 2004/0209983 A1  Oct. 21, 2004

Related U.S. Application Data

(62) Division of application No. 10/099,036, filed on Mar. 15, 2002, now Pat. No. 6,750,276, which is a division of application No. 08/692,138, filed on Aug. 5, 1996, now abandoned.

(51) Int. Cl.
*C08L 1/00* (2006.01)

(52) U.S. Cl.
USPC .......................................... 524/104; 524/379

(58) Field of Classification Search
USPC ................. 524/104, 127, 322, 379, 386, 445, 524/493
See application file for complete search history.

(56) References Cited

U.S. PATENT DOCUMENTS

| | | | |
|---|---|---|---|
| 2,791,567 A | 5/1957 | Lowe et al. | |
| 3,925,292 A | 12/1975 | Holmes | 260/29.6 |
| 3,956,401 A | 5/1976 | Scardera et al. | 260/615 B6 |
| 3,968,289 A | 7/1976 | Higbee | 428/195 B |
| 4,176,107 A | 11/1979 | Buckman et al. | 260/29.6 E |
| 4,252,969 A | 2/1981 | Broering et al. | 528/492 |
| 4,304,691 A * | 12/1981 | Farmer et al. | 510/125 |
| 4,647,610 A | 3/1987 | Sperry et al. | 524/377 |
| 4,650,827 A | 3/1987 | Becker et al. | 524/801 |
| 4,799,962 A | 1/1989 | Ahmed | 106/188 |
| 4,898,621 A | 2/1990 | Pruehs et al. | 134/25.2 |
| 4,925,587 A | 5/1990 | Schenker et al. | 252/174.22 |
| 4,981,730 A | 1/1991 | Zaleski | 427/393.5 |
| 4,997,471 A * | 3/1991 | Mente | 504/360 |
| 5,075,370 A | 12/1991 | Kubitza et al. | 524/591 |
| 5,214,086 A | 5/1993 | Mormile et al. | 524/237 |
| 5,236,624 A * | 8/1993 | Lepert et al. | 523/353 |
| 5,252,696 A | 10/1993 | Laas et al. | 528/49 |
| 5,399,617 A | 3/1995 | Farwaha et al. | 524/815 |
| 5,412,021 A | 5/1995 | Nakanishi | 524/523 |
| 5,507,867 A * | 4/1996 | Ruggiero et al. | 106/808 |
| 5,530,045 A * | 6/1996 | Brena et al. | 524/376 |
| 5,534,577 A * | 7/1996 | Namba et al. | 524/377 |
| 5,610,215 A * | 3/1997 | Nonweiler et al. | 524/376 |
| 5,700,768 A | 12/1997 | Lu | |

OTHER PUBLICATIONS

Charles R. Hegedus et al., "Film Formation Mechanism of Two-Component Waterborne Polyurethane Coatings", J. Coat. Tech. vol. 68, pp. 51-61 (Jan. 1996).

Cynthia Ahmed, "The Advantages of Two-Component Waterborne Soft Feel", Abstract from Adv. Coating Tech. Conference Exhibition, Nov. 7-9, 1995, pp. 3-11.

\* cited by examiner

*Primary Examiner* — Jason M Greene
(74) *Attorney, Agent, or Firm* — Saul Ewing LLP; Gianna Julian-Arnold; Rajesh Nair

(57) ABSTRACT

A waterborne, soft feeling coating composition and a substrate coated with the composition. The coating composition comprises an aqueous solvent, a resin, and an alcohol alkoxylate surfactant. The invention is also directed to a process of making the waterborne coating composition of the invention, and a process of coating a substrate with the waterborne coating composition.

14 Claims, No Drawings

WATERBORNE SOFT-FEELING COATING COMPOSITION WITH HIGH GLOSS

CROSS-REFERENCE TO RELATED APPLICATIONS

This application is a Divisional of U.S. patent application Ser. No. 10/099,036 filed Mar. 15, 2002 now U.S. Pat. No. 6,750,276, which is a Divisional of U.S. patent application Ser. No. 08/692,138 filed Aug. 5, 1996 now abandoned, the disclosures of which are incorporated by reference in their entireties.

BACKGROUND OF THE INVENTION

1. Field of the Invention

This invention relates to soft-feeling coatings, and more particularly to waterborne soft-feeling coatings that contain surfactants and result in a lacquer-like finish with high gloss.

2. Brief Description of the Related Art

Soft-feeling paints and coatings provide desirable aesthetic and tactile characteristics for a variety of applications, particularly articles that are touched by consumers. Automotive manufacturers have used soft-feeling coatings on instrument panels, armrests, and horn buttons to give hard, glossy plastic components a velvety smooth matte finish. Other consumer products, such as notebook computers and cellular phones, also use soft-feeling coatings to enhance look and finish of the products and give the appearance of a high-quality product.

Typical soft-feeling coating compositions use a two-component (2K) solvent based paint. While this two-component coating has desirable features, the content of volatile organic compounds (VOCs) is high, on the order of 4.2 to 5.0 pounds per gallon. Increasingly stringent environmental regulations have forced coating manufacturers to use other solvent systems with lower levels of VOCs. In addition, two-component soft coatings often result in different gloss levels due to varying ambient humidity and different rates of solvent evaporation on different areas of the coated article. Due to these problems, some manufacturers have experienced difficulties in producing uniformly finished parts.

One component (1K) waterborne soft-feel coatings have been developed as an alternative to solvent-based coatings. These coatings have considerably less VOCs (on the order of 1.5 to 2 pounds per gallon). However, they are generally regarded as not as "soft" as the two-component solvent-based coatings. In addition, one component waterborne coatings exhibit poor chemical resistance and weatherability.

Recently, two-component waterborne soft-feel coating systems have been developed to overcome the shortcomings of the one-component system. A two-component waterborne system is described in a technical journal article by Ahmed (SAE Spec. Pub. SP-1135, pp 59-64 (1996)), and by Hegedus et al., J. Coat. Tech. 68, 51-61 (January 1996). However, such two component waterborne systems provide about one-half the level of gloss (measured as "distinction of image" or DOI) provided by the two component solvent-based system. Accordingly, such waterborne coatings are not suitable when a high gloss, soft feeling coating is desired. In addition, these coatings display inadequate wetting and flow characteristics when applied to substrates, which, in turn, result in surface defects. To combat these defects, additives such as flow modifiers are included to enhance the flow and level attributes of the composition.

Flow modifiers perform many functions in applied coatings such as paint. Flow modifiers are used primarily to reduce or eliminate surface defects, such as craters, fisheyes, pinholes, and orange peel. They also aid in pigment dispersion, help facilitate air release, improve substrate wetting, and promote flow and leveling. Although flow modifiers are typically used at 0.25-0.5% by weight in liquid coatings and at 0.5-1.5% by weight in powder coatings, based upon the weight of the coating, they can be effective at levels as low as in the parts per million (ppm) range.

Surfactant compositions have been disclosed for purposes such as cleaning compositions and rinse aids. For example, U.S. Pat. No. 4,989,621 to Pruehs et al. discloses the use of hydroxyalkyl polyethylene glycol ethers in rinse aid compositions for dishwashing machines. However, to the knowledge of the present inventors, such surfactants have not been disclosed for coating applications.

U.S. Pat. No. 4,925,587 to Schenker et al. discloses hydroxyalkyl polyethylene glycol and hydroxyalkyl polypropylene glycol ethers as foam inhibiting additives in low foam cleaning preparations. However, to the knowledge of the present inventors, such additives have not been disclosed for coating compositions.

U.S. Pat. No. 3,956,401 to Scardera et al. disclose low foaming, biodegradable nonionic surfactants of the formula

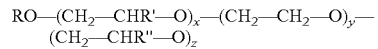

where R is a linear alkyl hydrocarbon having an average from about 7 to 10 carbon atoms, R' is a linear alkyl hydrocarbon of about 1 to 4 carbon atoms, R" is a linear alkyl hydrocarbon of about 1 to about 4 carbon atoms, x is an integer from 1 to 6, y is an integer from 4 to 15, and z is an integer from 4 to 25. Such surfactants are liquid at room temperature, nongelling in aqueous solutions, and are useful as detergents. However, such surfactants have not been heretofore disclosed for coating compositions to the knowledge of the inventors.

Amphoteric surfactants have been disclosed as a component of coating compositions. U.S. Pat. No. 5,399,617 to Farwaha et al. discloses amphoteric surfactants which are suitable as wet adhesion promoters and freeze-thaw stabilizers for use in both all acrylic and vinyl acrylic thermoplastic latex paints. However, the amphoteric nature of the surfactants makes them incompatible with certain solvents and undesirable for noncharged or positively charged surfaces.

Accordingly, there is still a need in the art for a waterborne, two-component coating composition that includes a surfactant to provide improved flow characteristics, soft-feel, and high gloss, as well as meet strict environmental guidelines. The present composition meets that need.

SUMMARY OF THE INVENTION

The present invention is a waterborne, two-component coating composition that includes an alcohol alkoxylate surfactant. The composition of the invention provides improved flow characteristics during application to a substrate. When applied to a substrate, the coating composition displays enhanced gloss and soft feel after drying.

One aspect of the present invention is directed to a waterborne coating composition, comprising:
(A) an aqueous solvent;
(B) a resin; and
(C) a surfactant, said surfactant having a formula selected from the group consisting of:

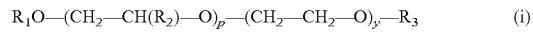

where $R_1$ is H or a substituted or unsubstituted alkyl group having 6-10 carbon atoms; $R_2$ is a substituted or unsubstituted alkyl group having 1-4 carbon atoms; $R_3$ is selected from the group consisting of —($CH_2$—CH($R_2$)—O)$_x$—H, —H, and —$CH_2$—CH(OH)—($CH_2$)$_z$ $CH_3$; p is an integer from 0-6; x is an integer from 1-6; y is an integer from 4-35; and z is an integer from 1-14; and

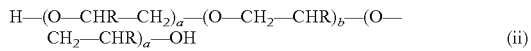
(ii)

where R is H or $CH_3$; a is an integer from about 1 to about 35; and b is an integer from about 5 to about 75.

Another aspect of the invention is directed to a coated substrate, comprising a substrate and a dry coating on the substrate, the dry coating comprising
(A) a resin; and
(B) a surfactant;
said surfactant having a formula selected from the group consisting of:

$$R_1O\text{---}(CH_2\text{---}CH(R_2)\text{---}O)_p\text{---}(CH_2\text{---}CH_2\text{---}O)_y\text{---}R_3 \quad (i)$$

where $R_1$ is —H or a substituted or unsubstituted alkyl group having 6-10 carbon atoms; $R_2$ is a substituted or unsubstituted alkyl group having 1-4 carbon atoms; $R_3$ is selected from the group consisting of —($CH_2$—CH($R_2$)—O)$_x$—H, —H, and —$CH_2$—CH(OH)—($CH_2$)$_z$ $CH_3$; p is an integer from 0-6; x is an integer from 1-6; y is an integer from 4-35; and z is an integer from 1-14; and

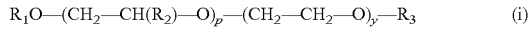
(ii)

where R is H or $CH_3$; a is an integer from about 1 to about 35; and b is an integer from about 5 to about 75.

Another aspect of the invention is directed to a process of making a waterborne coating composition, comprising combining an aqueous solvent, a resin, and a surfactant, said surfactant having a formula selected from the group consisting of:

$$R_1O\text{---}(CH_2\text{---}CH(R_2)\text{---}O)_p\text{---}(CH_2\text{---}CH_2\text{---}O)_y\text{---}R_3 \quad (a)$$

where $R_1$ is —H or a substituted or unsubstituted alkyl group having 6-10 carbon atoms; $R_2$ is a substituted or unsubstituted alkyl group having 1-4 carbon atoms; $R_3$ is selected from the group consisting of —($CH_2$—CH($R_2$)—O)$_z$—H, —H, and —$CH_2$—CH(OH)—($CH_2$)$_z$ $CH_3$; p is an integer from 0-6; x is an integer from 1-6; y is an integer from 4-35; and z is an integer from 1-14; and

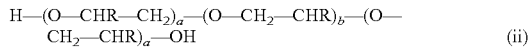
(b)

where R is H or $CH_3$; a is an integer from about 1 to about 35; and b is an integer from about 5 to about 75; the combination forming a waterborne coating composition.

Another aspect of the invention is directed to a process of coating a substrate, comprising applying a waterborne coating composition to a substrate, the waterborne coating composition comprising aqueous solvent, a resin, and a surfactant, said surfactant having the formula selected from the group consisting of:

$$R_1O\text{---}(CH_2\text{---}CH(R_2)\text{---}O)_p\text{---}(CH_2\text{---}CH_2\text{---}O)_y\text{---}R_3 \quad (a)$$

where $R_1$ is —H or an a substituted or unsubstituted alkyl group having 6-10 carbon atoms; $R_2$ is a substituted or unsubstituted alkyl group having 1-4 carbon atoms; $R_3$ is selected from the group consisting of —($CH_2$—CH ($R_2$)—O)$_z$—H, —H, and —$CH_2$—CH(OH)—($CH_2$)$_z$ $CH_3$; p is an integer from 0-6; x is an integer from 1-6; y is an integer from 4-35; and z is an integer from 1-14; and

(b)

where R is —H or $CH_3$; a is an integer from about 1 to about 35; and b is an integer from about 5 to about 75.

These and other aspects will become apparent upon reading the following detailed description of the invention.

DETAILED DESCRIPTION OF THE INVENTION

It has been surprisingly found that an alcohol alkoxylate surfactant added to a waterborne coating composition provides improved flow characteristics during application of the composition to a substrate. In addition, the alcohol alkoxylate surfactant aids in leveling the composition on the substrate as it is applied, and results in enhanced gloss and soft feel when the composition is dry.

As used herein, the term "soft feel" refers to a coating with a velvety-smooth texture when touched. The term "surfactant" is used herein to refer to any compound that reduces surface tension when dissolved in water or water solutions, or which reduces interfacial tension between two liquids, or between a liquid and a solid. The term "lacquer-like" refers to finishes with Specular Gloss levels of 75 and higher.

Solvents useful in the waterborne composition of the invention include any aqueous solvent that is capable of blending the ingredients of the formulation and not separating into distinct phases over time. One preferred solvent is water, because it functions as both as a solvent and a carrier of the other water soluble components of the formulation. In addition, various water soluble organic solvents known in the paint art may be added to the water solvent. Useful water-soluble organic solvents include, but are not limited to, N-methylpyrrolidone (NMP) for hydroxy-functional acrylic-polyurethane resin binders, and propylene glycol for acrylic resin binders. These water soluble organic solvents are added to the water solvent to form water/N-methypyrrolidone mixtures and water/propylene glycol mixtures which are effective solvents for the formulation. In some applications, resins are available as aqueous emulsions and additional solvents are not required. One example of such an emulsified resin is "CARBOSET" CR-714 acrylic emulsion, which includes acrylic polymers emulsified in aqueous solvents. Preferably, the total solvent content of the formulation is from about 20 to about 80% by weight of the total composition.

The resin component of the composition may be any conventional binding resin known in the coating and paint arts, such as polyurethane, acrylic, epoxy, polyester, vinyl, latex, styrene acrylic, hydroxyl-functional acrylic-polyurethane, alkyd, and combinations of these. The resin component of the composition is preferably present in sufficient quantity to cause adhesion of the fillers or pigments to the substrate, and to hold and/or bind all the other materials of the composition together. Preferably, the binder component makes up from about 12 to about 85% by weight of the final composition.

The composition of the present invention includes a surfactant component of the general formula:

$$R_1O\text{---}(CH_2\text{---}CH(R_2)\text{---}O)_p\text{---}(CH_2\text{---}CH_2\text{---}O)_y\text{---}R_3$$

where $R_1$ is —H or a substituted or unsubstituted alkyl group having 6-10 carbon atoms; $R_2$ is a substituted or unsubstituted alkyl group having 1-4 carbon atoms, $R_3$ is —($CH_2$—CH($R_2$)—O)$_x$—H; or —H; or —$CH_2$—CH (OH)—($CH_2$)$_z$$CH_3$); p is an integer from 0-6; x is an integer from 1-6; y is an integer from 4-35; and z is an integer from 1-14. The surfactant included in the present composition acts as a homogenizing agent for the binder and the other components of the composition. The non-polar nature of the surfactant homogenizes the components into a coating composition that flows smoothly and evenly, and leaves substantially no imperfections on the substrate. In addition, surfactant component of the invention acts as a defoaming agent to remove air from the mixed coating blend, which improves flow and enhances the final coating. The amount of surfactant included in the composition of the invention preferably ranges from 0.01 to 3.0% by weight of the total composition, and more preferably between 0.2-0.5% by weight of the total composition.

Exemplary surfactants useful in the composition of the present invention include poly(oxyethylene/oxypropylene) alkyl ethers sold under the trademark "POLYTERGENT". If desired, this compound is suitably end-capped with a lower alkyl group, such as propylene oxide (PO), sold under the trade name "POLY-TERGENT" SLF Series. End-capped compounds are particularly useful because they discourage foaming during preparation of the formulation. A particularly useful surfactant is poly(oxyethylene/polypropylene)mono-hexyl ether, monooctyl ether, and monodecyl ether sold under the tradename of "POLYTERGENT S405LF".

Other useful surfactants includes alkene oxide-capped linear alcohol alkoxylates containing ethylene oxide moieties in the backbone and contain at least one propylene oxide moiety in the backbone, and sold under the trade name "POLY-TERGENT" SLF-18B Series. This family of surfactants is characterized by enhanced biodegradability. Such surfactants are disclosed in U.S. Pat. Nos. 4,925,587 and 4,898,621, and the whole of each is incorporated by reference herein in their entirety. Advantageously, use of the "POLY-TERGENT" SLF Series and/or "POLY-TERGENT" SLF-18B Series surfactants in the present invention avoids the need for an antifoaming agent in the formulations and working compositions of the present invention.

Alternatively, nonionic surfactants which are coblock polymers of ethylene oxide/propylene oxide monomers may be used in the formulation of the invention. These compounds are known commercially as the "POLY-TERGENT" P and E Series and are available from Olin corporation. These compounds have the general formula H—(O—CHR—CH$_2$)$_a$—(O—CH$_2$—CHR)$_b$—(O—CH$_2$—CHR)$_a$—OH where R is —H or CH$_3$; a is an integer from about 1 to about 35; and b is an integer from about 5 to about 75 may be used.

One preferred surfactant has the formula

H—(OCH$_2$CH$_2$)$_x$—(OCH$_2$CHCH$_3$)$_y$—(OCH$_2$CH$_2$)$_x$—OH where x is an integer from 1 to 35, and y is an integer from 10 to 75. Several preferred compositions of this surfactant are described in Table I which illustrates various useful combinations of x and y groups as used in the above formula. Values of x that are not whole numbers represent the average value of x derived from a population of molecules. "A" denotes a surfactant preparation that is approximately 10% EO capped, "B" is a surfactant preparation that is approximately 20% EO capped, "C" is a surfactant preparation that is approximately 30% EO capped, etc. The first two digits of each name represents the approximate total molecular weight of the PO groups divided by 100. Each compound listed in Table I is available commercially under the trademark "POLY-TERGENT".

TABLE I

| Cmpd Name | x | y | % EO |
|---|---|---|---|
| P-9E | 11.5 | 16 | 51 |
| P-17A | 2.5 | 31 | 11 |
| P-17B | 7.5 | 31 | 27 |
| P-17D | 12 | 31 | 36.5 |
| P-22A | 4 | 39 | 13.5 |
| P-22E | 26 | 40 | 50 |
| P-32A | 4.5 | 60 | 10 |
| P-32C | 14.5 | 52 | 30 |
| P-32D | 17 | 56 | 31.7 |
| P-32E | 33.5 | 51 | 50 |
| P-37C | 18.5 | 71 | 28 |

Another preferred surfactant has the formula:

H—(OCH(CH$_3$)CH$_2$)$_y$—(OCH$_2$CH$_2$)$_x$—(OCH$_2$CH(CH$_3$))$_y$—OH where x is an integer from 5 to 20 and y is an integer from 15 to 25. Several preferred compositions are described in Table II which illustrate various useful combinations of x and y groups as used in the above formula. In Table II, "A" denotes a surfactant that is approximately 10% PO capped, and "B" denotes a surfactant that is approximately 20% PO capped. The first two digits of each name represents the approximate total molecular weight of the EO groups divided by 100. Each compound listed in Table II is available commercially under the trademark "POLY-TERGENT".

TABLE II

| Cmpd Name | x | y | % PO |
|---|---|---|---|
| E-17A | 7 | 19 | 88 |
| E-17B | 15 | 17 | 75 |
| E-25B | 16 | 23 | 79 |

The composition of the invention may also include additional additives, such as fillers, pigments, dispersing agents, antifoaming agents, antimicrobial agents, and combinations thereof. Generally, these components are included to add certain characteristics to the composition of the invention.

Fillers may be added to the composition of the invention to fill holes and other surface imperfections in the substrate. The filler component included in the composition is preferably a solid, particulate material of colloidal size or greater. Filler materials useful in the composition of the invention include fillers known in the art, such as common clays, kaolin, montmorillonite (bentonite), clay mica (muscovite), and chlorite, or fine-grained hydrous aluminosilicates which frequently contain appreciable amounts of iron, magnesium, calcium, sodium and potassium. Alternatively, other fillers known in the art, such as calcium carbonate, may be implemented. Preferably, the filler comprises from about 0% to about 30% by weight of the total weight of the composition, and more preferably about 10% to about 25% by weight of the total composition.

The formulation of the invention may be made without pigments to produce a clearcoat for application to previously colored substrates, such as stained wood, painted automobile body parts, automobile interior parts, automobile airbags, and the like. However, pigments may be added to give the final composition any desirable hue. For example, white pigments such as titanium dioxide, talc, or zinc oxide render the final coating white. Alternatively, other pigments known in the art may be added to give the formulation any color, such as red, orange, yellow, green, blue, indigo, violet, or combinations of these. Useful pigments include "TINTS-ALL 11" lamp black, "TINTS-ALL 29" prussian blue (phthalo blue), "TINTS-ALL 15" American vermillion, "TINTS-ALL 1" yellow light, or other pigment known in the paint and coating art. Preferably, the pigment comprises from about 0% to about 50% of the total weight of the composition.

The dispersing agent may be a material such as nonionic surfactants and acrylic polymers, such as 2,5-furandione polymer sold under the tradename "TAMOL 731". The dispersing agent is generally added in small percentages to help disperse the fillers and smooth the coating onto the substrate. Preferably, the dispersing agents comprise 0.01 to 5% of the final coating weight.

The antifoaming agent may be silicon oils, mineral oils, modified alcohol ethoxylates, EO/PO block copolymers (repeating blocks of ethyoxy and propoxy groups), phosphate esters, hydrophobicsilica, and fatty alcohols as well as blends of these defoamers. Other antifoaming agents and/or leveling agents include coblock polymers of EO/PO sold under the trademark "BASF PLURONICS", alkoxylated straight chain alcohols sold under the trademark "PLURFACS"; alkoxylated fatty acids, alcohols, or glycols sold under the trademark "ANTAROX"; alkoxylated alcohols and coblock polymers of EO/PO sold under the trademark "MACOL"; alkylphenol alkoxylates sold under the trademark "TRITON CF"; alkoxylated alcohols sold under the trademark "TRITON DF"; alkylated secondary alcohols sold under the tradename "TERGITOL", "MINIFOAM", "15S" and "TMN"; and alkoxylated linear alcohols and glycols sold under the trademark "SURFONIC". The antifoaming agent preferably comprises about 0 to about 5% by weight of the final coating weight.

An antimicrobial agent may also be included in the composition of the invention. Antimicrobial compounds discourage growth of mold and fungus when the formulation of the invention is applied to damp areas, such as structural exteriors in damp environments, boats, or other areas where growth of mold and fungus are common. Compounds useful as antimicrobial agents include zinc pyrithione, sodium pyrithione, 2,2'-dithiobis(pyridine-1-oxide), 10,10'-oxybisphenoxarsine; N-(trichloromethylthio)-4-cyclo-hexene-1,2-dicarbonamide; 2,3,5,6-tetrachloro-4-(methlysulfonyl)pyridine; N-(trichloromethylthio) phthalimide; N-hydroxy-6-octyloxypyridine-2(1H) 1, ethanolamine salt; dodecylbis(hydroxyethyl)dioctyl ammonium phosphate and dodecylbis(hydroxyethyl) octyl hydrogen ammonium phosphate and other phosphate amines; 3-trimethyoxysilylpropyl dimethyloctadecylammonium chloride and other quaternary ammonia compounds including quaternary ammonium salts; 2,4,4'-trichloro-2'-hydroxy-diphenylether and other phenol derivatives such as 2 phenylphenol or dichlorophene or 2,2'-methylenebis(4-chlorophenol); diodomethyl-p-tolyl sulfone, 2-n-octyl-4-isothiazolin-3-one and other isothiazoline derivatives such as benzisothiazoline and their combinations; organometallics such as tributyltin compounds: tributyltinoxide or tributyltin maleate; dithio-2,2'-bis(benzmethylamide); N-trichloromethylthio-4-cyclohexene-1,2-dicarboximide; 2-(4-thiazolyl)benzimidazole; thiocyanic acid; 2-benzothiazolylthio)methyl ester; 2,4,5,6, tetrachloro-1,3-benzenedicarbonitrile; 2[(trichloromethyl)thio]-1H-isoindole-1,3(2H)-dione; 3a,4,7,7a-tetrahydro-2[(trichloromethyl)thio]-1H-isoindole-1,3(2H)-dione; 1,1-dichloro-N-methanesulfamide; alkoxysiloxane quaternary compounds; copper-8-quinolinolate; copper napthenate, copper-2-ethyl-hexoate; parabens, 3-iodopropargyl-N-butylcarbamate (IPBC) and sulfur compounds. Preferably, the antimicrobial component is present from about 0 to about 20% by weight of the final coating formulation, and more preferably from about 3% to about 5% by weight of the final coating formulation.

The components of the invention may be combined using a ball mill, high intensity mixer, blender, roll mill, or other mixing device known in the art. A fraction of the solvent (about 40% to 50% of the total amount of solvent) is first added to the mixer or mill. Solid components, such as surfactants, pigments, and dispersing or leveling agents are added to the solvent and mixed. Resin is then added to the mixture, followed by the remaining solvent. All the ingredients are mixed until the desired viscosity is produced.

The waterborne, soft-feeling coating composition of the invention may be applied to any suitable substrate, such as wood, plastic, metal, paper, composites, plaster, or glass. When used as a clearcoat (i.e., without pigment), the formulation may be applied on top of a paint layer. Such an application is useful in automobile body and interior parts, and as a protective coating for floors subjected to heavy traffic.

The resulting coating may be applied by brushing, spraying, or rolling, and dries to a smooth coating, free of cracks, brushmarks, roller striations, orange peel, sagging, running, curtaining or uneven film thickness.

The waterborne coating of the invention provides a substrate with a durable, high gloss finish (high DOI) with a soft-feeling texture. The performance characteristics of the coating may be evaluated by applying a quantity of the formulation to a black and white card and spread evenly with a draw bar to form a layer of material approximately 3 mil thick. This layer is dried, and the hardness and gloss are evaluated by standard ASTM tests described below. Drying conditions are usually at temperatures ranging from 40° F. to 400° F. and atmospheric pressure, depending on the coating composition. For example, coatings used on automobile bodies may be dried at 300-350° F. in an oven. Coatings used on architectural parts, such as floors and walls are generally dried at 40° F. to 90° F. Preferably, drying occurs at room temperature and atmospheric pressure. The applied coating material is generally dry to the touch in less than 24 hours. The composition is completely cured in less than 15 days.

The waterborne, soft-feeling coating composition of the invention is suitable for any substrate that requires a high-gloss, durable finish with a soft-feel and resistance characteristics. Applications of the waterborne, soft-feeling coating of the invention include architectural applications (i.e., structural walls, doors), floors, countertops, bowling balls, and the like. Floors, particularly dance floors, gymnasium floors, and basketball courts, are suitable for the coating of the invention because these substrates frequently require finishes that have high gloss, yet need resistance to prevent slippage.

The following examples illustrate the composition of the invention, but are not intended to limit the scope of the invention. All parts and percentages are by weight and all temperature are by degrees Celsius, unless explicitly stated otherwise.

Example 1

A waterborne 2-component (2K) top coat for industrial application based on a water soluble hydroxy-functional acrylic-polyurethane was prepared as follows:

| Parts by wt | Component |
|---|---|
| | Part A |
| 25 | water (solvent) |
| 1 | N-methylpyrrolidone (solvent) |
| 9 | diacetone alcohol (solubilizer) |
| 15 | Titanium Dioxide (pigment) |
| 7 | Calcium Carbonate (filler) |
| 2 | Talc (pigment) |
| | Part B |
| 25 | water |
| 0.02 | Dabco T1402 (dibutyltin antimicrobial) |
| 0.28 | POLYTERGENT S405LF (surfactant) |
| 70.27 | ACPU-1 (Hydroxyl-functional acrylic-polyurethane resin) |
| 10.23 | PM acetate (propylene glycol methyl ether acetate solubilizer) |

The "POLY-TERGENT" S405LF surfactant is a linear alcohol alkoxylate known chemically as poly(oxyethylene/oxypropylene)monohexyl ether, monooctyl ether, or monodecyl ether.

The ingredients of Part A were blended with a premier Caframo high intensity mixer at 5000 rpm for 20 minutes. The ingredients of Part B were blended separately with the mixer at 1500 rpm for 15 minutes. Part B was added to Part A and mixed at 1500 rpm for 20 minutes to totally homogenize the mixture.

Following homogenization, 19.20 parts by weight polyisocyanate was added at rate of 4% per minute while the mixture is blended at 2000 rpm. The dispersion was mixed for 45 minutes until smooth and homogenized. The composition was applied to a black and white cardboard card, drawn to about 3 mil in thickness, and dried at room temperature and pressure.

The hardness of the dried material was evaluated by the ASTM D3360 Standard test method for film hardness. This test yields 8H-9H hardness as shown on the scale below:
 6B-5B-4B-3B-2B-B-HB-F-H-2H-3H-4H-5H-6H-7H-8H-9H
 soft→hard The gloss level of the dried material was evaluated by the ASTM D 523-89 Standard test method for Specular Gloss at Gloss 60°. This test yields an 89.9 reading with high gloss finishes with a hard surface and soft feel.

Example 2

A waterborne 2K top coat for industrial application based on water soluble hydroxy-functional acrylic-polyurethane without filler was made as follows:

| Parts by wt | Component |
|---|---|
| | Part A |
| 50 | water |
| 1 | N-methylpyrrolidone |
| 9 | diacetone alcohol |
| | Part B |
| 0.02 | Dabco T 1402 |
| 0.28 | S405LF surfactant |
| 70.27 | ACPU-1 (Hydroxyl-functional acrylic-polyurethane) |
| 10.23% | PM acetate (propylene glycol methyl ether acetate) |

Parts A and B were prepared as described in Example 1. Following homogenization, 19.20 parts by weight polyisocyanate were added at rate of 4% per minute at a mixing speed of 2000 rpm. The dispersion was mixed for 45 minutes until smooth and homogenized. The formulation was applied and dried as described in Example 1.

The ASTM D3363 standard test method for film hardness for this composition was 8H. The ASTM D 523-89 standard test method for Specular Gloss values at Gloss 60° were 84.5-88.1, with high gloss (lacquer-like finishes), a hard surface and soft feel.

Example 3

A waterborne top coat for industrial applications was prepared from an aqueous acrylic emulsion. This formulation incorporates the surfactant "POLYTERGENT" S-405-LF. The surfactant has a synergistic effect on the coating in the wet state to minimize the formation of microfoam. In addition, increased gloss results from improved air release and low foam.

| Parts by wt | Component |
|---|---|
| 62.29 | "CARBOSET" CR-714 acrylic emulsion |
| 0.00072 | "DEE FO 3000" (hydrocarbon defoamer) |
| 0.398 | "ARCOSOLV" (dipropylene glycol tertiary butyl ether) |
| 0.40 | Glycol Ether EB |
| 0.0019 | "POLY-TERGENT" S-405-LF (surfactant) |
| 0.00036 | "SURFYNOL" DF-110D (nonionic polymer defoamer) |
| 0.0077 | "TEGOGLIDE" 410 (polyether siloxane lubricant) |
| 0.403 | "MICHEM" 39235 (Mar Additive) |

A premier Caframo high intensity mixer at 1500 rpm was used to mix the defoamer and the acrylic emulsion for about 20 minutes. The mixer speed was reduced to 1000 rpm and the "ARCOSOLV" and the glycol ether EB were added and mixed for 10 minutes. The remainder of the ingredients were added to the mixture and blended. An aqueous ammonia solution (28%) was added to the emulsion to adjust the pH to about 7.5-7.8. The final mixture was blended for 45 minutes until smooth and homogeneous.

The ASTM D3363 Standard test method for film hardness was determined to be F-H, and the ASTM D 523-89 Standard test method for Specular Gloss at Gloss 60° yielded a value of 68.4.

Example 4

A water based latex coating may be prepared as follows:

| Parts by wt | Component |
|---|---|
| PART A: | |
| 106.15 | water |
| 1.5 | hydroxyethyl cellulose (thickener) |
| 25.9 | propylene glycol |
| 3.3 | Tamol 731 (2,5-furandione polymer dispersant |
| 0.95 | Colloid 653, antifoamer |
| 1.2 | Troysan 731 preservative |
| 125 | titanium dioxide |
| PART B: | |
| 245.3 | Joncryl 537 acrylic polymer |
| 12.75 | Texanol (ester alcohol solvent) |
| 0.95 | Colloid 653 (antifoam) |
| 1.05 | S-405-LF (surfactant) |
| 0.5 | NH$_4$OH (28%) |

The first three ingredients from Part A were blended in a premier Caframo high intensity mixer at 1500 rpm, and then combined with the remaining Part A components. The resulting mixture was blended for 30 minutes until smooth and homogenized. The components of Part B were blended separately at 1500 rpm until thoroughly mixed, then added to Part A. The combined parts were blended for an additional 40 minutes.

The ASTM D3363 standard test method for film hardness by pencil test was determined to be HB, and the ASTM D 523-89 standard test method for Specular Gloss values at Gloss 60° was 20.9.

Although the invention has been shown and described with respect to illustrative embodiments thereof, it should be appreciated that the foregoing and various other changes, omissions and additions in the form and detail thereof may be made without departing from the spirit and scope of the invention as delineated in the claims. All patents and patent applications mentioned are herein incorporated by reference in their entirety.

We claim:

1. A coated substrate, comprising:
(1) a substrate; and
(2) a dry coating on said substrate, said dry coating consisting essentially of:
(A) a resin selected from the group consisting of polyurethane resin, acrylic resin, epoxy resin, polyester resin, alkyd resin, styrene acrylic copolymer resin, hydroxyl-functional acrylic-polyurethane resin, and combinations thereof; and
(B) a surfactant;
said surfactant having a formula selected from the group consisting of:

$$H—(OCH_2CH_2)_x—(OCH_2CHCH_3)_y—(OCH_2CH_2)_x—OH \quad (i)$$

where x is an integer from 1 to 35, and y is an integer from 10 to 75; and $$H—(OCH(CH_3)CH_2)_y—(OCH_2CH_2)_x—(OCH_2CH(CH_3))_y—OH \quad (ii)$$

where x is an integer from 5 to 20 and y is an integer from 15 to 25;
wherein said resin comprises from about 12 to about 85% by weight based upon the total weight of said dry coating, and said surfactant comprises 0.01 to 3.0% by weight based upon the total weight of said dry coating; and
wherein said dry coating has a soft feel, specular gloss of 75 or greater as measured by the ASTM D523-89 method, and hardness of 8H or greater as measured by the ASTM D3363 method.

2. A process of coating a substrate, comprising the steps of:
applying a waterborne coating composition to a substrate, said waterborne coating composition consisting essentially of a combination of
(1) aqueous solvent,
(2) a resin selected from the group consisting of polyurethane resin, acrylic resin, epoxy resin, polyester resin, alkyd resin, styrene acrylic copolymer resin, hydroxyl-functional acrylic-polyurethane resin, and combinations thereof, and
(3) a surfactant, said surfactant having the formula selected from the group consisting of:

$$H—(OCH_2CH_2)_x—(OCH_2CHCH_3)_y—(OCH_2CH_2)_x—OH \quad (i)$$

where x is an integer from 1 to 35, and y is an integer from 10 to 75; and $$H—(OCH(CH_3)CH_2)_y—(OCH_2CH_2)_x—(OCH_2CH(CH_3))_y—OH \quad (ii)$$

where x is an integer from 5 to 20 and y is an integer from 15 to 25;
wherein said aqueous solvent comprises about 20 to about 80% by weight based upon the total weight of said coating composition, said resin comprises from about 12 to about 85% by weight based upon the total weight of said coating composition, and said surfactant comprises 0.01 to 3.0% by weight based upon the total weight of said coating composition; and
wherein said coating, when dried, has a soft feel, specular gloss of 75 or greater as measured by the ASTM D523-89 method, and hardness of 8H or greater as measured by the ASTM D3363 method.

3. The process of claim 2, wherein said aqueous solvent is selected from the group consisting of water, water/N-methylpyrrolidone mixtures, water/propylene glycol mixtures, and combinations thereof.

4. The process of claim 2, further comprising the step of drying said coating to form a dry coating on a substrate.

5. A coated substrate, comprising:
(1) substrate; and
(2) a dry coating on said substrate, said dry coating consisting essentially of
(A) a resin selected from the group consisting of polyurethane resin, acrylic resin, epoxy resin, polyester resin, alkyd resin, styrene acrylic copolymer resin, hydroxyl-functional acrylic-polyurethane resin, and combinations thereof; and
(B) a surfactant having the formula $$H—(OCH_2CH_2)_x—(OCH_2CHCH_3)_y—(OCH_2CH_2)_x—OH$$

where x is an integer from 1 to 35, and y is an integer from 10 to 75; and wherein said dry coating has a soft feel, specular gloss of 75 or greater as measured by the ASTM D523-89 method, and hardness of 8H or greater as measured by the ASTM D3363 method.

6. A coated substrate, comprising:
(1) a substrate; and
(2) a dry coating on said substrate, said dry coating consisting essentially of
(A) a resin selected from the group consisting of polyurethane resin, acrylic resin, epoxy resin, polyester resin, alkyd resin, styrene acrylic copolymer resin, hydroxyl-functional acrylic-polyurethane resin, and combinations thereof; and
(B) a surfactant having the formula

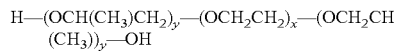

where x is an integer from 5 to 20, and y is an integer from 15 to 25; and
wherein said dry coating has a soft feel, specular gloss of 75 or greater as measured by the ASTM D523-89 method, and hardness of 8H or greater as measured by the ASTM D3363 method.

7. A process of coating a substrate, comprising the steps of:
applying a waterborne coating composition to a substrate, said waterborne coating composition consisting essentially of a combination of
(1) aqueous solvent selected from the group consisting of water, water/N-methylpyrrolidone mixtures, water/propylene glycol mixtures, and combinations thereof.
(2) a resin selected from the group consisting of polyurethane resin, acrylic resin, epoxy resin, polyester resin, alkyd resin, styrene acrylic copolymer resin, hydroxyl-functional acrylic-polyurethane resin, and combinations thereof, and
(3) a surfactant having the formula:

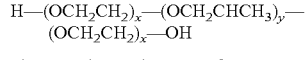

where x is an integer from 1 to 35, and y is an integer from 10 to 75;
wherein said aqueous solvent comprises about 20 to about 80% by weight based upon the total weight of said coating composition, said resin comprises from about 12 to about 85% by weight based upon the total weight of said coating composition, and said surfactant comprises 0.01 to 3.0% by weight based upon the total weight of said coating composition; and
wherein said coating, when dried, has a soft feel, specular gloss of 75 or greater as measured by the ASTM D523-89 method, and hardness of 8H or greater as measured by the ASTM D3363 method.

8. The process of claim 7, further comprising the step of drying said coating to form a dry coating on a substrate.

9. A process of coating a substrate, comprising the steps of:
applying a waterborne coating composition to a substrate, said waterborne coating composition consisting essentially of a combination of
(1) aqueous solvent selected from the group consisting of water, water/N-methylpyrrolidone mixtures, water/propylene glycol mixtures, and combinations thereof.
(2) a resin selected from the group consisting of polyurethane resin, acrylic resin, epoxy resin, polyester resin, alkyd resin, styrene acrylic copolymer resin, hydroxyl-functional acrylic-polyurethane resin, and combinations thereof, and
(3) a surfactant having the formula:

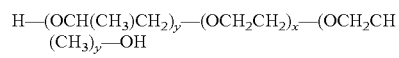

where x is an integer from 5 to 20 and y is an integer from 15 to 25;
wherein said aqueous solvent comprises about 20 to about 80% by weight based upon the total weight of said coating composition, said resin comprises from about 12 to about 85% by weight based upon the total weight of said coating composition, and said surfactant comprises 0.01 to 3.0% by weight based upon the total weight of said coating composition; and
wherein said coating, when dried, has a soft feel, specular gloss of 75 or greater as measured by the ASTM D523-89 method, and hardness of 8H or greater as measured by the ASTM D3363 method.

10. The process of claim 9, further comprising the step of drying said coating to form a dry coating on a substrate.

11. A coated substrate, comprising:
(1) a substrate; and
(2) a dry coating on said substrate, said dry coating consisting essentially of
(A) a resin selected from the group consisting of polyurethane resin, acrylic resin, epoxy resin, polyester resin, alkyd resin, styrene acrylic copolymer resin, hydroxyl-functional acrylic-polyurethane resin, and combinations thereof; and
(B) a poly(oxyethylene/oxypropylene)monohexyl ether surfactant;
wherein said resin comprises from about 12 to about 85% by weight based upon the total weight of said dry coating, and said surfactant comprises 0.01 to 3.0% by weight based upon the total weight of said dry coating; and
wherein said dry coating has a soft feel, specular gloss of 75 or greater as measured by the ASTM D523-89 method, and hardness of 8H or greater as measured by the ASTM D3363 method.

12. A process of coating a substrate, comprising the steps of:
applying a waterborne coating composition to a substrate, said waterborne coating composition consisting essentially of a combination of
(1) aqueous solvent,
(2) a resin selected from the group consisting of polyurethane resin, acrylic resin, epoxy resin, polyester resin, alkyd resin, styrene acrylic copolymer resin, hydroxyl-functional acrylic-polyurethane resin, and combinations thereof, and
(3) a poly(oxyethylene/oxypropylene)monohexyl ether surfactant;
wherein said resin solvent comprises about 20 to about 80% by weight based upon the total weight of said coating composition, said resin comprises from about 12 to about 85% by weight based upon the total weight of said coating composition, and said surfactant comprises 0.01 to 3.0% by weight based upon the total weight of said coating composition; and
wherein said coating, when dried, has a soft feel, specular gloss of 75 or greater as measured by the ASTM D523-89 method, and hardness of 8H or greater as measured by the ASTM D3363 method.

13. The process of claim 12, wherein said aqueous solvent is selected from the group consisting of water, water/N-methylpyrrolidone mixtures, water/propylene glycol mixtures, and combinations thereof.

14. The process of claim 12, further comprising the step of drying said coating to form a dry coating on a substrate.

* * * * *